(12) United States Patent
Johnson, Jr. et al.

(10) Patent No.: US 6,363,606 B1
(45) Date of Patent: *Apr. 2, 2002

(54) PROCESS FOR FORMING INTEGRATED STRUCTURES USING THREE DIMENSIONAL PRINTING TECHNIQUES

(75) Inventors: David W. Johnson, Jr., Bedminster; Gregory P. Kochanski, Dunellen; Louis J. Lanzerotti, Morristown; Cindy M. Pribble, Dunellen; David J. Thomson, Murray Hill, all of NJ (US)

(73) Assignee: Agere Systems Guardian Corp., Orlando, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,503

(22) Filed: Oct. 16, 1998

(51) Int. Cl.⁷ .............................................. H01R 43/00
(52) U.S. Cl. ............................ 29/854; 29/593; 264/496
(58) Field of Search ................................ 29/854, 623.2, 29/593; 264/25, 69, 407, 408, 496; 369/474.24, 522

(56) References Cited

U.S. PATENT DOCUMENTS 3,921,916 A * 11/1975 Bassous ...................... 239/601
3,974,248 A * 8/1976 Atkinson ..................... 264/406
4,207,105 A * 6/1980 Sato ............................ 430/432
4,574,329 A * 3/1986 Eijkelenkamp et al. ..... 361/321
4,597,984 A * 7/1986 Lansma ........................ 427/28
4,612,689 A * 9/1986 De Wild et al. ........... 29/25.42
4,961,154 A * 10/1990 Pomerantz et al. ......... 364/522
5,088,047 A * 2/1992 Bynum .................. 364/474.24
5,204,055 A * 4/1993 Sachs et al. .................... 419/2
5,238,642 A * 8/1993 Benquet et al. ............. 264/284
5,251,802 A * 10/1993 Bruxvoort et al. .......... 228/121
5,387,380 A * 2/1995 Cima et al. .................... 264/69
5,437,820 A * 8/1995 Brotz .......................... 264/25
5,647,931 A * 7/1997 Retallick et al. ........... 156/73.6
5,911,947 A * 6/1999 Mitchell .................... 29/623.2

* cited by examiner

Primary Examiner—Lee Young
Assistant Examiner—A. Dexter Tugbang
(74) Attorney, Agent, or Firm—Thomas, Kayden, Horstemeyer & Risley LLP

(57) ABSTRACT

An improved process for making a structure using three dimensional printing techniques is disclosed. Briefly stated, the method can be summarized by the following steps: A first type of powder material is deposited in a defined area to form a first layer. Next, a binder material is applied to certain regions of the first type of powder to define a portion of the structure to be formed. And finally, a portion of the unbound powder is removed using a technique such as vacuuming. The foregoing steps are repeated a sufficient number of times to create the desired shape of the structure as defined by the regions held by the binder material.

34 Claims, 11 Drawing Sheets

PROCESS FOR FORMING INTEGRATED STRUCTURES USING THREE DIMENSIONAL PRINTING TECHNIQUES

BACKGROUND OF THE INVENTION

The present invention relates generally to the fabrication of structures using three dimensional printing techniques and, more particularly, to the fabrication of complex structures, such as electromechanical assemblies, comprising two or more materials using three dimensional printing.

In today's competitive marketplace, one of the keys to business success is the ability to shorten the time period between product conception and manufacture of a finished product suitable for delivery to a customer. Customer demand for a product may last for only a short time period, which is generally called the market window or window of opportunity for that product. Manufacturers that are unable to deliver a working product in the market window are at a severe competitive disadvantage with those companies that are quick to respond to market demands. A major component in the time required to transform a product conception into a finished article suitable for sale is the time involved in developing a functioning prototype.

In recent years, attention has been directed towards developing processes by which parts and tooling devices, such as molds and dies, can be rapidly fabricated to create functioning product prototypes. An example of such a process is the computer controlled, three dimensional printing technique disclosed in U.S. Pat. No. 5,387,380 to Cima et al. This patent discloses a process for making three dimensional parts in which a layer of powder (e.g., a powdered ceramic, a powdered metal, or a powdered plastic) about 100 microns thick is spread over a working surface. A single slice of the part or mold pattern is then printed into the powder by spraying a binder material onto the powder using specially designed ink-jet print heads. This process is repeated with each new layer being stacked on top of the previous layer. After the entire part has been printed, pressure or heat is applied to bond the layers into one uniform part. The excess powder that was not printed on is usually poured or shaken out of the part before any final heat or pressure treatment is applied. The entire process is controlled by a computer running a computer aided design (CAD)/computer aided manufacturing (CAM) program.

The CAD/CAM system ensures that the printing on the various layers corresponds with a computer model of the three dimensional part being formed.

While the aforementioned process is useful for rapidly prototyping three dimensional parts, there remains room for improvement in the art. Specifically, existing three dimensional printing techniques are limited to the fabrication of monolithic parts or structures. That is, the parts are derived from a single powdered material. As a result, existing three dimensional printing processes are not applicable for rapid prototyping of electromechanical devices. At best, the housing or shell of an electromechanical part can be prototyped using three dimensional printing with the remainder of the part being assembled using standard manufacturing procedures.

Accordingly, what is sought is a process by which electromechanical parts (i.e., parts having both conductive and dielectric components) can be prototyped using three dimensional printing techniques. It is further desirable that the process be capable of incorporating discrete, external components into the part during the printing process.

SUMMARY OF THE INVENTION

Certain advantages and novel features of the invention will be set forth in the description that follows and will become apparent to those skilled in the art upon examination of the following or may be learned with the practice of the invention.

To achieve the advantages and novel features, the present invention is generally directed to an improved process for making a structure using three dimensional printing techniques. Briefly stated, the method can be summarized by the following steps: A first type of powder material is deposited in a defined area to form a first layer. Next, a binder material is applied to certain regions of the first type of powder to define a portion of the structure to be formed. And finally, a portion of the unbound powder is removed using a technique such as vacuuming. The foregoing steps are repeated a sufficient number of times to create the desired shape of the structure as defined by the regions held by the binder material.

In accordance with an aspect of the invention, the binder material is either a metallic binder or a dielectric binder such that the structure contains electrical conductive regions where a metallic binder is applied and dielectric regions where a dielectric binder is applied.

In accordance with another aspect of the invention, external components can be incorporated into the structure during the printing process by inserting the components into evacuated regions that are formed during the powder removal step. Alternatively, components that are thinner than a layer of powder can be attached to a bound region (i.e., a region of powder with the binder applied) and then covered in a subsequent powder deposition step. As a result, a component can be incorporated into the structure such that it is entirely confined in a bound region of powder.

The present invention can also be embodied in a two powder process. In this regard, a second type of powder material that is different from the first type of powder material is also deposited in the defined area. A binder material is applied to certain regions of the second type of powder that further defines a portion of the structure to be formed. At least a portion of the unbound powder material is removed using, for example, a vacuuming technique. These steps are repeated as necessary until the completed structure is formed.

According to one aspect of the invention, the first and second powders are chosen such that the first powder material is a dielectric powder and the second powder material is a conductive powder.

The improved three dimensional printing process according to the present invention has many advantages, a few of which are set forth hereafter as examples.

Manufacturing costs for electromechanical structures are reduced as both conductive and dielectric regions can be formed in the structure during the printing process thus requiring fewer electrical connectors and/or wiring harnesses. Moreover, discrete components can be built in to the structure during the printing process, which eliminates further assembly steps.

Identification tags can be designed into structures using the improved three dimensional printing process of the present invention. For example, conductive and dielectric regions can be formed in the structure as a pattern of ones and zeros that can be read by a processor or a logic system as an identification code. Similarly, cavities and/or regions filled with a material having a higher atomic number on average than the remainder of the structure can be incorporated into the structure that would show up during an X-ray or ultrasonic examination. These types of identification tags are difficult if not impossible to alter without damaging the structure. Accordingly, the identification tags can be used to discourage theft or counterfeiting.

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENT

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

A diagrammatic representation of the fabrication of a part using three dimensional printing as practiced in the prior art is depicted in FIGS. 1A through 1E. Beginning in FIG. 1A, a powder distribution head 22 dispenses a thin layer of powder approximately 100–200 microns thick in a confined region defined by form 24 for fabricating pieces 26 and 28 of an unfinished part. Many different types of powdered materials can be used including ceramic powders (e.g., alumina, zirconia, ziconium silicate, and silicon carbide), metallic powders, and plastic powders. In practice, the type of powder chosen will generally depend on the nature of the part being prototyped. Preferably a spherical powder is chosen for the three dimensional printing process as these types of powders have low internal friction, thus enhancing their flowability. The improved flowability allows precise volumes of powder to be dispensed by head 22 and also minimizes the potential for developing clogs or restrictions in the powder delivery system.

Figure 3:
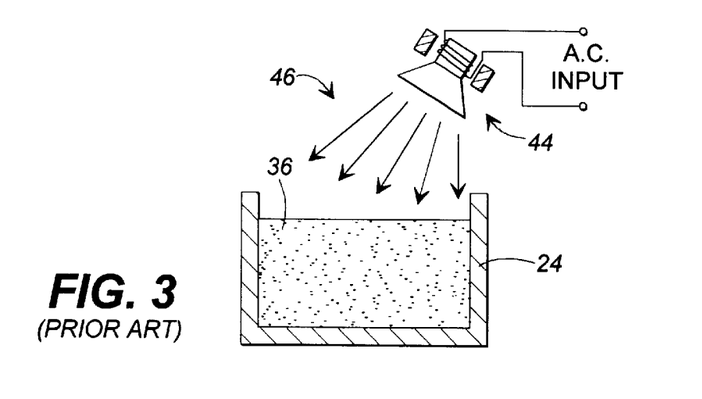
Figure 4:
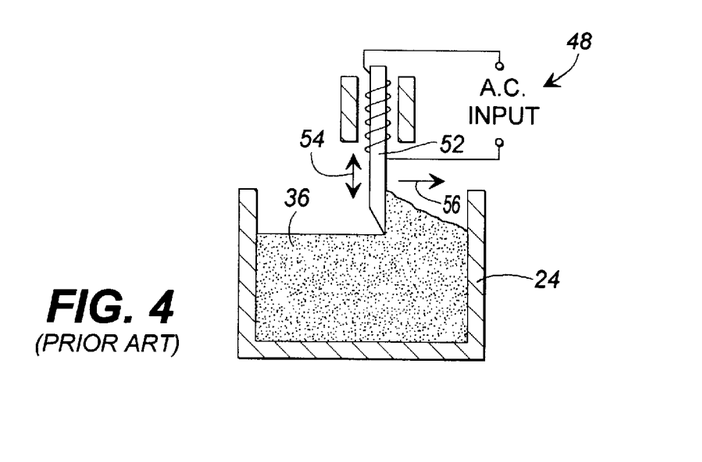

Depending on the nature of the part being fabricated, it may be desirable to compact the powder to affect the porosity level. Head 22 merely smoothes out a powder pile or sweeps the powder pile in from the side. Accordingly, the desired compaction can be achieved through such techniques as vibration, application of acoustic energy, or vibration through a piezoelectric scraper. These techniques are illustrated in FIGS. 2–4 respectively.

Figure 2:
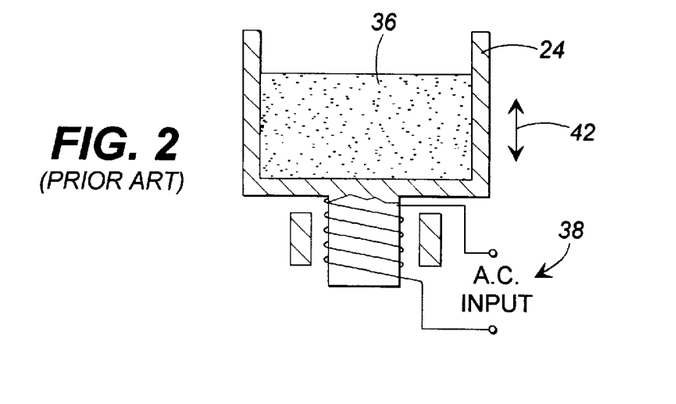
FIGS. 2–4 depict methods for compacting powder material as part of the three dimensional printing process depicted in FIGS. 1A–1E.

In FIG. 2, powder 36 is compacted through mechanical vibration applied to form 24 through transducer 38 as indicated by arrow 42. FIG. 3 shows an alternative approach in which an acoustic generator 44 is used to direct acoustic energy onto the surface of powder 36 to compact the powder. Finally, in FIG. 4, a vibrating transducer system 48 is used to compact powder 36 by vibrating piezoelectric scraper 52 in a motion indicated by arrow 54 while scraper 52 is drawn across the surface of powder 36 in a direction as shown by arrow 56.

Returning to FIGS. 1A and 1B, once the layer of powder has been deposited and properly compacted, binder deposition head 32 prints a layer of binder material onto the previously deposited layer of fresh powder as shown in FIG. 1B. The binder material bonds the powder in the areas where it is printed to define the dimensions of the part. For example, in FIG. 1B, binder deposition head 32 prints binder material across the newly deposited layer of powder to join pieces 26 and 28 that were defined through previous iterations of powder and binder deposition. While binder deposition head 32 is depicted as a single ink-jet print head for purposes of this description, binder deposition head 32 typically comprises a plurality of inkjet dispenser heads that spray jets of binder material to selective regions of a layer of powder. Multiple types of binders can be used in the three dimensional printing process. For example, organic binders, typically in the form of polymeric resins, are often used with ceramic powders. The organic binders can be either water soluble, such as cellulosic binders or soluble only in volatile organic solvents, such as butyral resins. Another organic binder that works well with ceramic powders is polycarbosilazane.

If the binder is to be incorporated into the final part, it is beneficial to use an inorganic binder. The inorganic binders are generally silicate based and are typically formed from the polymerization of silicic acid or its salts in aqueous solution. Tetraethylorthosilicate (TEOS) is another inorganic binder that works well for three dimensional printing.

Figure 1A:
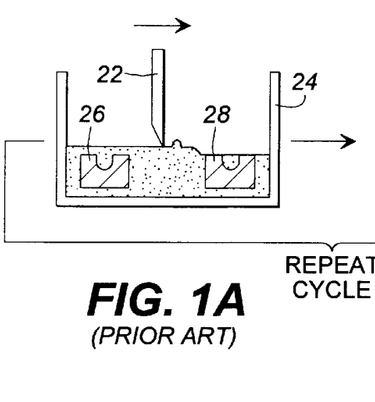
FIGS 1A–1E are diagrammatic views that illustrate three dimensional printing as practiced in the prior art.
Figure 1B:
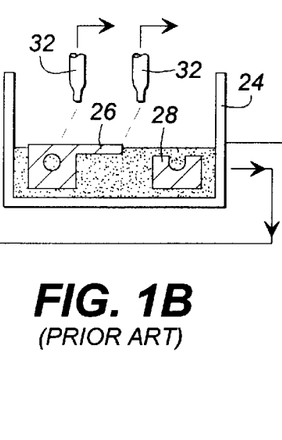
Figure 1C:
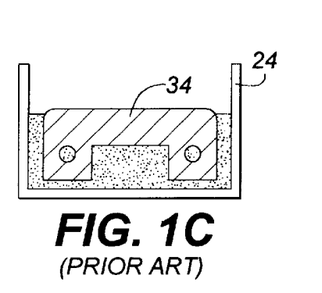
Figure 1D:
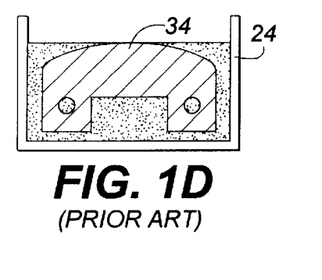
Figure 1E:
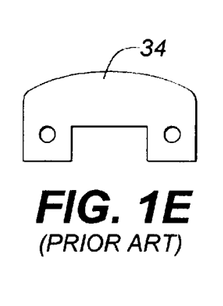

Referring now to FIG. 1C, the iterative process of depositing a layer of powder via powder distribution head 22 (FIG. 1A) and selectively binding the powder via binder deposition head 32 (FIG. 1B) continues, thereby forming a prototype part 34 layer by layer. Part 34 is shown partially completed in FIG. 1C and after the last application of binder in FIG. 1D. The process is precisely controlled through a CAD/CAM system that uses a model of part 34 to control the deposition of powder and binder. The movements of both powder distribution head 22 and binder deposition head 32 are controlled through the CAD/CAM system via a motor assembly, such as a stepping motor or a servo-controlled motor. After part 34 is completely formed, excess, unbound, powder is removed using any suitable technique, such as vacuuming or ultrasonic cleaning, to produce a finished part as shown in FIG. 1E.

During the process of forming part 34, the binder material provides some measure of hardening as each layer is processed. Nevertheless, in some instances, further processing may be desirable. For example, part 34 may be heat treated through a sintering process or pressure treated to enhance the bond between the powder particles. Binder materials can be chosen that withstand the heat treating process or, alternatively, that are designed to be consumed when heated.

The foregoing description of three dimensional printing for part fabrication or prototyping is provided as an overview of the basic principles involved. The application of three dimensional printing to the development of part prototypes is described in greater detail in U.S. Pat. Nos. 5,340,656 to Sachs et al. and 5,387,380 to Cima et al., both entitled "Three Dimensional Printing Techniques," and each of which is incorporated herein by reference.

While three dimensional printing has proven to be very useful in developing part prototypes and tooling molds made from a monolithic material, it is desirable to extend the use of three dimensional printing to the fabrication of parts that are comprised of a plurality of materials. In particular, it is desirable to fabricate electromechanical parts in which portions of the part are made from a dielectric powder (e.g., ceramic powder) and other portions of the part are made from a conducting powder (e.g., metallic powder). Two alternative processes-a one powder process and a multiple powder process-that make use of three dimensional printing techniques are disclosed hereafter for fabricating structures or parts having both conductive and dielectric regions. It should be understood, however, that the principles of the invention can be applied to the fabrication of any type of complex structure that is comprised of multiple materials or a single material whose properties (e.g., porosity, conductivity, etc.) vary throughout the structure.

One Powder Process

Figure 5A:
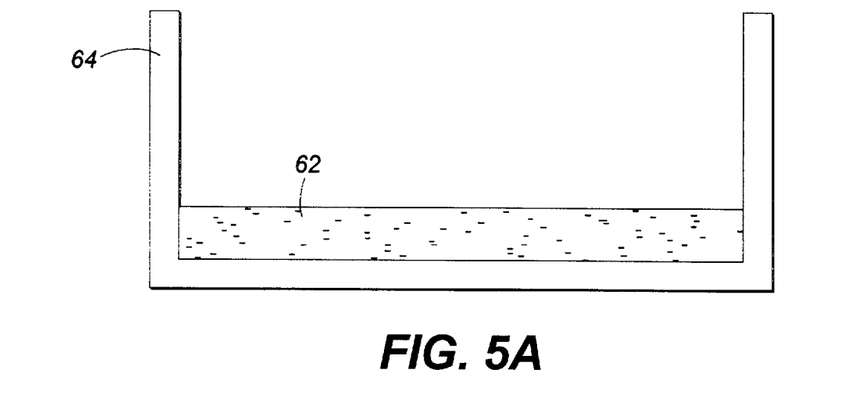
FIGS. 5A–5D are diagrammatic views that illustrate an improved three dimensional printing process according to the present invention that uses a single powder type.

With reference to FIGS. 5A through 5D, a modified three dimensional printing process for fabricating a structure using a single powder and having both conductive regions and dielectric regions will be described in accordance with the principles of the present invention. Referring now to FIG. 5A, the process begins by depositing a layer of dielectric powder 62 in form 64 using standard powder deposition techniques discussed hereinbefore. Preferably, powder 62 is a mixture of ceramic or cermet powder and metallic powder that is near the percolation threshold. That is, powder 62 borders on being classified as a conducting material, but nevertheless remains an insulator in its current state. Typically, the mixture will be comprised of at least 10% by volume of the ceramic powder and at least 10% by volume of the metallic powder.

Figure 5B:
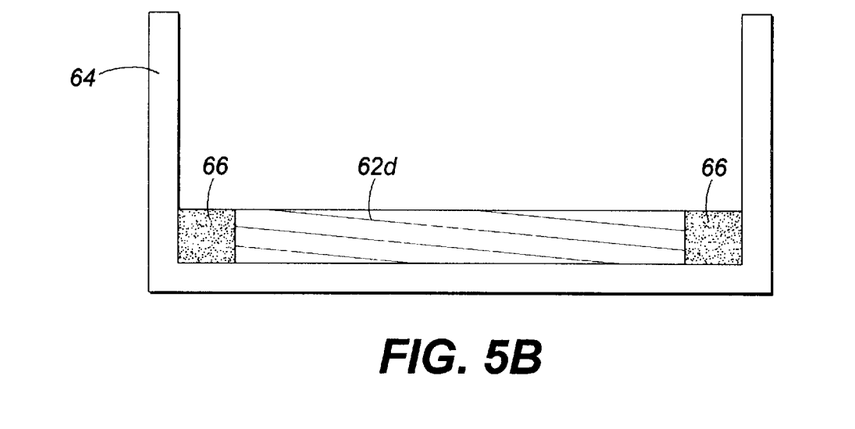

In step two of the process shown in FIG. 5B, powder 62 is sprayed with a binder using the standard binder deposition techniques discussed hereinbefore to create a bound region 62a. In the example shown, buffer regions 66 are left unbound along the edges or borders of form 64. The binder chosen can be an ink containing either metallic or dielectric particles. If a metallic binder is chosen, powder 62 will be converted into a conductor in region 62d because powder 62 was nearly conductive prior to deposition of the binder. Conversely, if a dielectric binder is chosen, powder 62 will be converted into an insulator in region 62d because powder 62 was already a dielectric prior to deposition of the binder and the dielectric binder merely enhances the insulating capability of powder 62. Assume, for purposes of illustration, that a dielectric ink is chosen and that region 62d is therefore defined as a dielectric region.

Figure 5C:
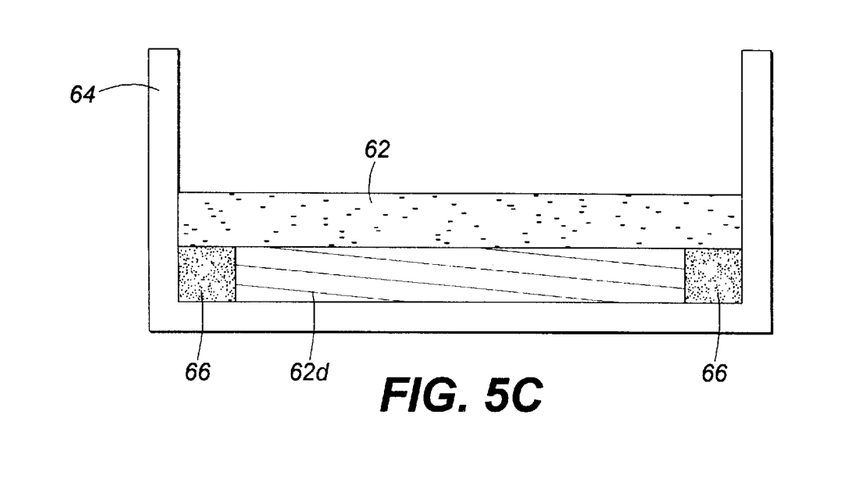
Figure 5D:
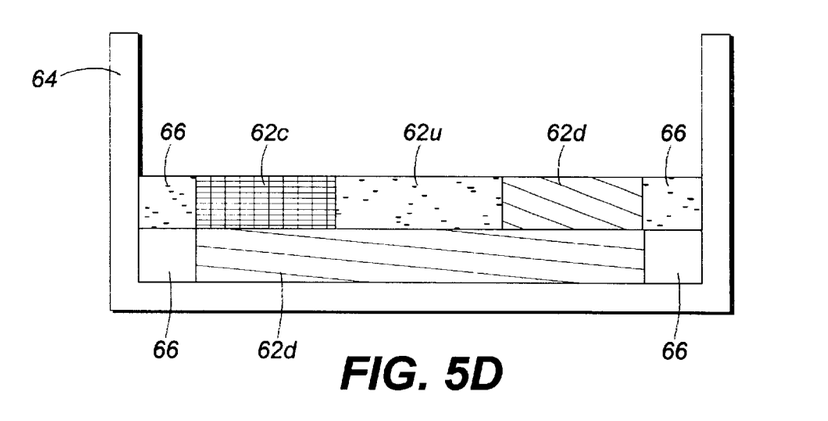

The process continues at FIG. 5C where a second layer of powder 62 is deposited onto the first layer shown in FIG. 5B. FIG. 5D depicts the processing of this second layer of powder 62 shown in FIG. 5C through selective application of both a metallic binder and a dielectric binder. First, a dielectric binder is applied to region 62d to convert powder 62 into a dielectric material. Next, a metallic binder is applied to the same layer in region 62c to convert powder 62 into a conducting material. Note, separate ink jet dispenser heads are typically used for the two inks to avoid contamination. The region 62u is powder that is left unbound and will thus become an aperture in the completed structure or device. During each printing cycle (i.e., deposition of a new layer) unbound powder can be vacuumed away or left as part of the layer for removal once the structure is complete. Evacuating unbound powder prior to completion of the structure allows external components or sub-assemblies to be incorporated. As in the first layer of FIG. 5B, a boundary region 66 of unbound powder is left along the edge of form 64. Based on the two layers shown in FIG. 5D, it can be seen that both conductive and dielectric regions can be formed in the same part or device by selectively applying the proper type of binder material. Moreover, conductive and dielectric regions can be formed in the same layer of the structure (e.g., regions 62c and 62d in FIG. 5D). Specifically, each layer is not limited to being either a conductive layer or a dielectric layer.

The advantage of the single powder process is that it is a relatively simple process to implement. One drawback to this process, however, is that the conductive regions and the dielectric or insulator regions are not of high quality. That is, the conductive regions are not low loss conductors and the dielectric regions do not have a high breakdown voltage. This drawback can be overcome to some extent through use of special binders that have a greater impact on the electrical characteristics of the powder. For example, in the case of metallic binders for generating conductive regions, it has been found beneficial to use a binder where the conductive particles in the binder become progressively more concentrated near the surface of the powder particles. More specifically, if the binder contains a volatile component, the conductive particles in the binder will become concentrated as the volatile component evaporates. These conductive particles are held to the powder particles by surface tension. As the binder volume continues to decrease, the conductive particles in the binder coalesce into a dense conductive layer on the surface of the powder. One exemplary implementation of such a metallic binder would be a polymer solution in solvent, with 15% by volume suspended sub-micron silver particles.

An alternative single powder process is also envisioned in which the binder and the powder interact or chemically react to create desired structural properties. For example, a powder comprising semiconductor crystals can be used with a binder that contains dopant atoms that will diffuse into the powder to change its electrical properties. Similarly, the powder could react with a binder to convert the surface of the powder grains into either a conductive or insulating state. The binder could be a metastable chemical system, such as an electroless plating solution, that reacts with itself and deposits metals onto the powder surface.

Multiple Powder Process

Figure 6A:
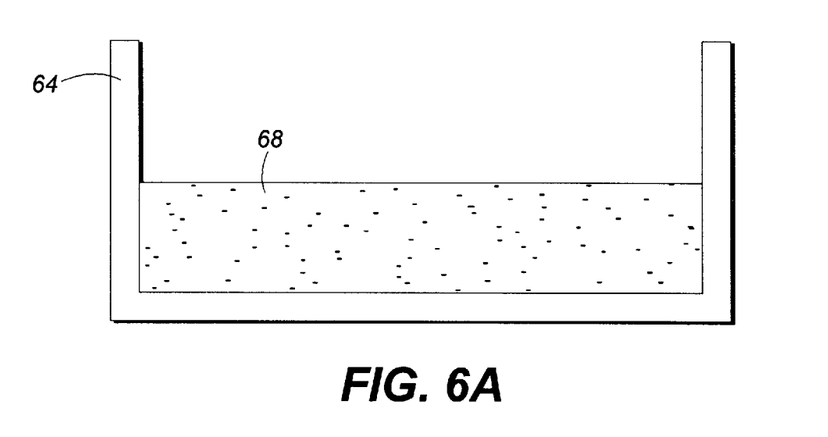
FIGS. 6A–6F are diagrammatic views that illustrate an improved three dimensional printing process according to the present invention that uses multiple powder types.
Figure 6B:
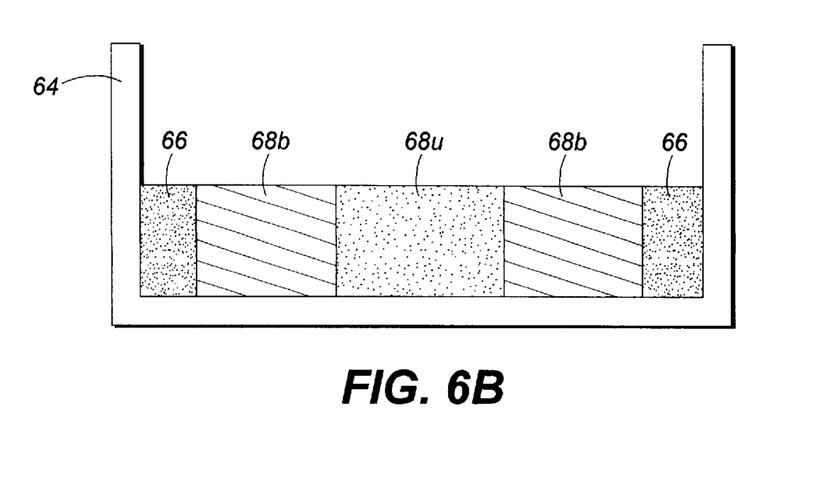

With reference to FIGS. 6A through 6F, a modified three dimensional printing process for fabricating a structure using multiple powders and having both conductive regions and dielectric regions will be described in accordance with the principles of the present invention. Referring now to FIG. 6A, the process begins by depositing a layer of dielectric powder 68, such as a ceramic or cermet powder in form 64 using standard powder deposition techniques discussed hereinbefore. In step two of the process, illustrated in FIG. 6B, a binder is applied to dielectric powder 68 in regions 68b to form non-conducting regions in this first cross-sectional layer of the structure or device. Buffer regions 66 are left unbound along the edges or borders of form 64 and a section of unbound powder 62u is left in between regions 68b.

Figure 6C:
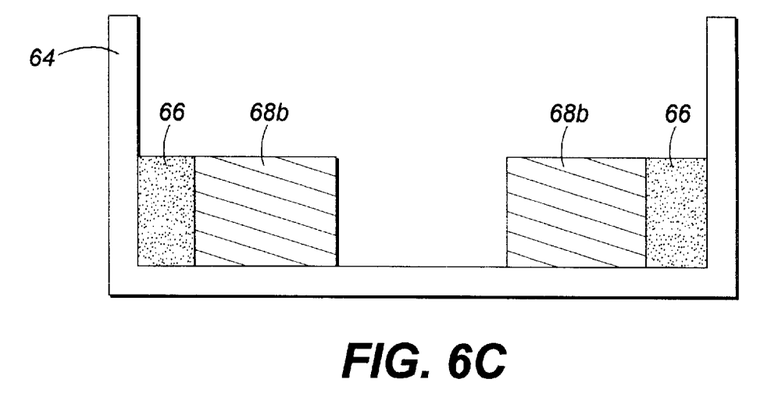

After the binder has been applied to the first layer of dielectric powder 68, the unbound powder 68u is vacuumed away in regions where the conductive or metallic powder will be deposited. As shown in FIG. 6C, the unbound powder 68u has been vacuumed away in between regions 68b. While vacuuming works well in many circumstances, it could damage delicate or finely formed features (i.e., regions 68b). To remove unbound powder in the vicinity of fragile bound features, it has been found useful to electrically charge the unbound particles, using a corona point for example, so that the powder can be removed electrostatically. Note that it is not necessary to remove unbound powder after each printing cycle (i.e., deposition of powder material and introduction of binder). For example, unbound powder could be left in a layer that will be evacuated once the structure is fully formed to thereby provide an aperture in that region.

Figure 6D:
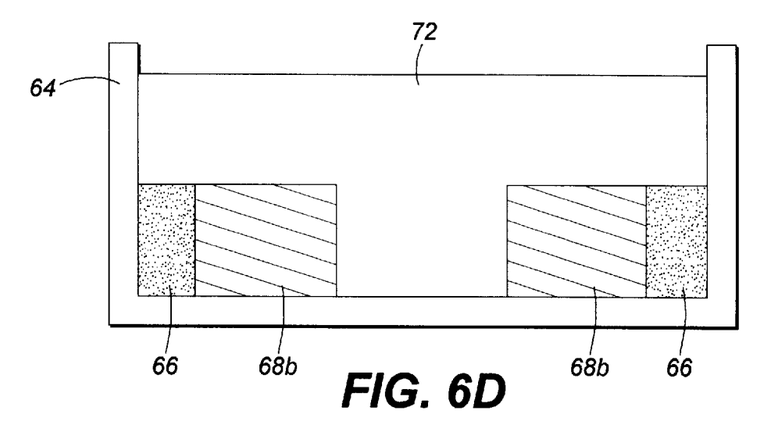
Figure 6E:
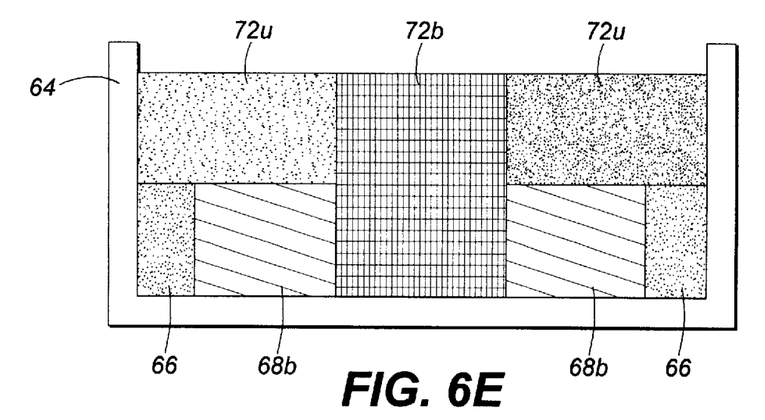

At this stage in the process a layer of conductive or metallic powder 72 is deposited that fills in the opening in between regions 68b in the first layer of bound dielectric powder while also providing a second layer of conductive powder as depicted in FIG. 6D. A binder is then applied to conductive powder 72 as illustrated in FIG. 6E to form a bound conductive region 72b that spans both the first and second layers. Unbound metallic powder 72u is shown on adjacent sides of bound conductive region 72b in the second layer.

Figure 6F:
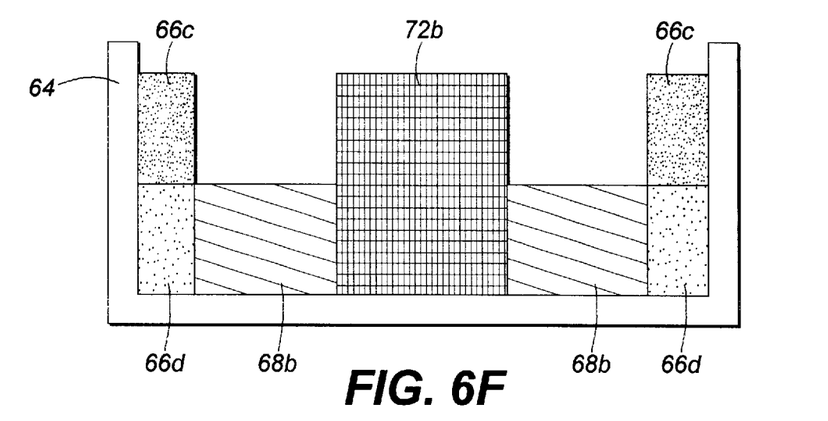

Finally, regions 72u are vacuumed away in regions to be filled by dielectric powder during deposition of the next layer as shown in FIG. 6F. Again, note that unbound powder (conductive powder 66c and dielectric powder 66d) is left along the border or edge of form 64.

The type of binder used to bind the powder is dependent upon whether the structure will be heat treated (i.e., sintered) to solidify or harden the structure after the three dimensional printing process is complete. Heat treating, in general, enhances the conductivity of the conductive or metallic particles (powder) in the conductive regions. Nevertheless, in some circumstances, such as applications in which sensitive electronic components may be incorporated into the structure, heat treating is not a feasible option. In those cases, an epoxy binder is used that glues the entire structure, including both dielectric and conductive particles, together. If the structure will be heat treated, the following types of conductive powders are preferred: silver or silver plated particles, or a mixture of tungsten and alumina powder. Conversely, if an epoxy binder is used, silver or copper powder is preferred as the conductive powder.

To improve the conductivity of the bound conductive layers, studs may be inserted to make contact with the conductive layers and a plating solution pumped through the structure to deposit a deep enough layer of metal to bridge between conducting particles in the bound conductive powder to produce a continuous metal surface. The amount of metal deposition in the plating process can be controlled by the following three techniques: 1) varying the porosity of the structure (regions with low porosity tend to prevent the flow or diffusion of ions, thus acting as a barrier); 2) leaving channels in the structure to allow plating solutions to be pumped through structure; and 3) adjusting the voltage applied to different conductive regions. As an alternative to electroplating, electroless plating can also be used and has the advantage that the conductive regions to be plated do not need to be connected to a power supply. Electroless plating, however, produces a very thin metal deposit, which may not provide the level of conductivity desired.

It should be recognized that while the invention has been described herein with reference to a two powder example, the principles can nevertheless be applied to any number of powder types. For example, in addition to the conductive and dielectric powders discussed in the foregoing, a third powder having a high dielectric constant could be included in the three dimensional printing process to integrate capacitors in the structure.

Figure 7A:
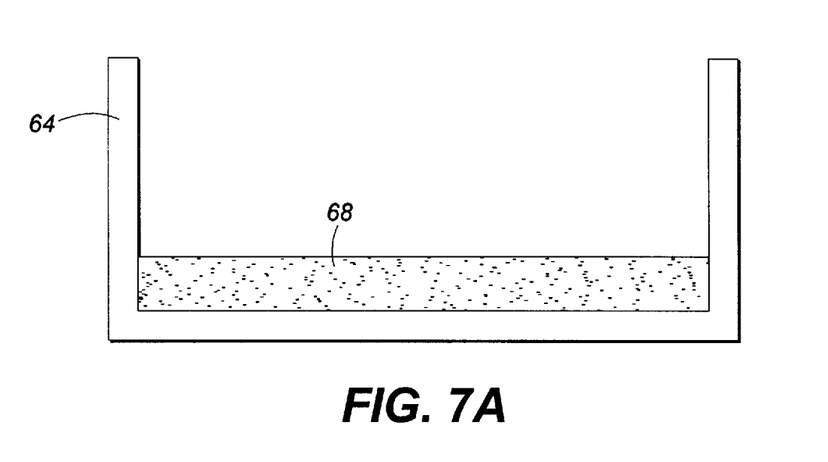
FIGS. 7A–7E are diagrammatic views that illustrate potential problems encountered in practicing the multiple powder, three dimensional printing process of FIGS. 6A–6F.
Figure 7B:
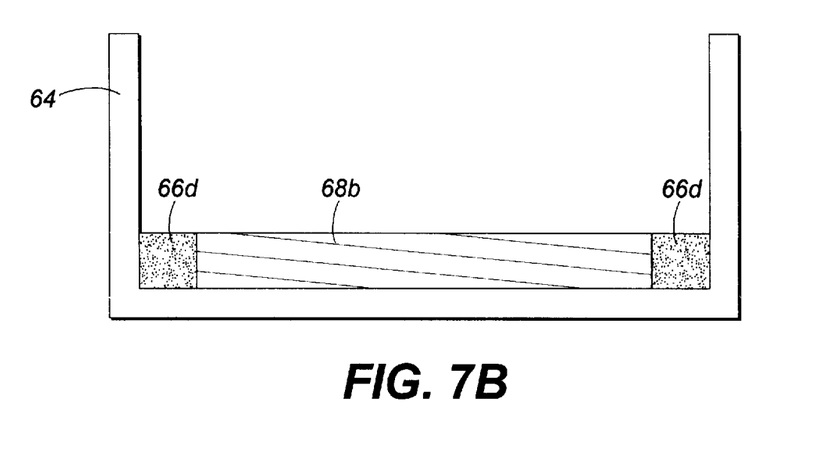
Figure 7C:
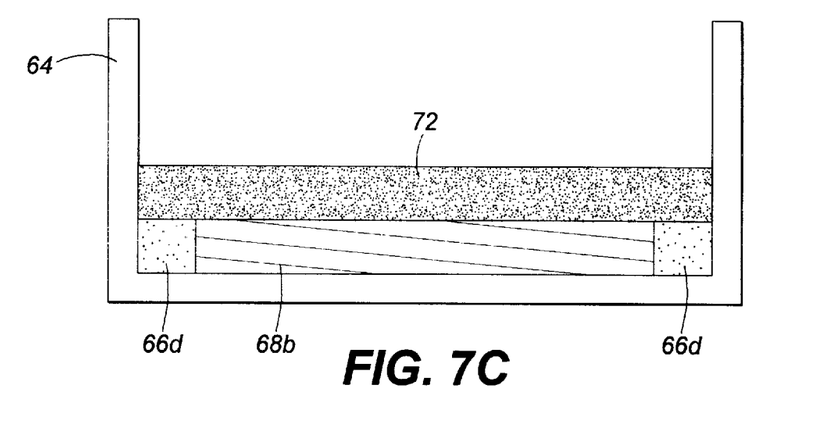
Figure 7D:
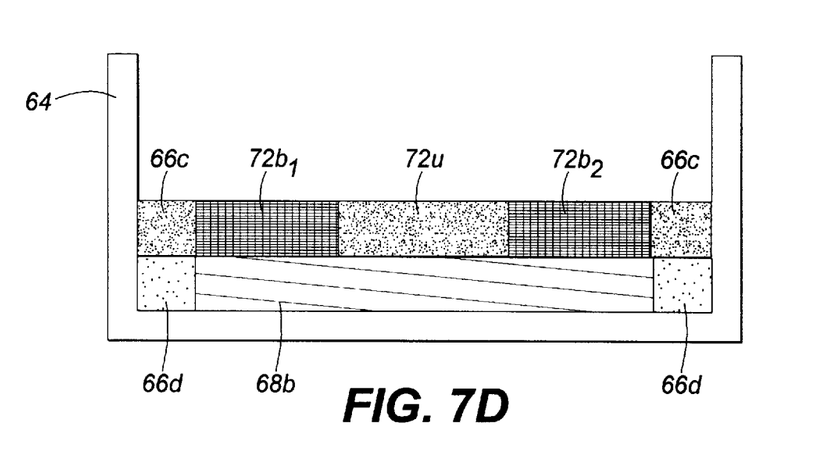

FIGS. 7A through 7E illustrate potential problems that can be encountered when performing the multiple powder process. In this sequence of diagrams, a dielectric powder 68 is deposited as a first layer in FIG. 7A and a binder is applied to form a bound layer 68b shown in FIG. 7B. Next, a layer of conductive powder 72 deposited as shown in FIG. 7C. One potential problem that can be encountered is that some of the conductive powder 72 sticks to the bound surface of dielectric layer 68b. This can be detrimental to the electrical performance of the structure as illustrated in FIG. 7D where a binder is applied to regions $72b_1$ and $72b_2$ with a region of unbound powder 72u left therebetween. If a thin layer of conductive powder has stuck to the surface of dielectric layer 68b, an electrical path could be formed between the two bound regions $72b_1$ and $72b_2$ that could cause electrical shorts between the two regions. Conversely, when dielectric powder is applied to a bound region of conductive powder, the dielectric powder could stick to the surface of the conductive powder and cause breaks in electrical continuity.

To overcome the stickiness problem where binder has been applied, the bound regions can be cured with ultraviolet (UV) light so that the surface is hard before a subsequent layer of powder is deposited. Alternatively, the surface can be corona-treated to adjust the stickiness of the surface. Another approach is to make a second pass with the same type of powder to fill in any remaining sticky sites. Excess powder can then be removed through vacuuming, thus leaving a non-stick surface on which to apply a subsequent layer.

To minimize the problem of sticky surfaces, binder should be applied sparingly with just enough used to secure the powder. As a result, some of the surface of the bound region will remain dry and the dry region will not have a sticky surface. In general, the powder should retain some porosity after -the binder has been applied. Otherwise, if the binder completely fills the interstices of the powder, excess binder will tend to ooze over the surface of the powder, which can cause the surface to become nonflat and also exacerbate the sticky surface problem. Moreover, excess binder can form a solid layer of binder without any embedded powder particles, which can lead to undesired electrical properties. Finally, the printing resolution can also be degraded as the binder will tend to flow to drier regions, thus reducing the control one has in ensuring a uniform deposition of binder. It may be desirable in certain circumstances to overfill (i.e., add more binder than the interstices of the powder can absorb) localized areas of powder. These regions should be small enough that the neighboring powder can absorb the excess binder. Overfilling could be used, for example, to create impermeable regions to prohibit the flow of plating solutions or to provide a hermetic seal. In addition, if a dielectric or conductive binder is used, small regions could be produced having a very high conductivity or a very high dielectric constant.

Figure 7E:
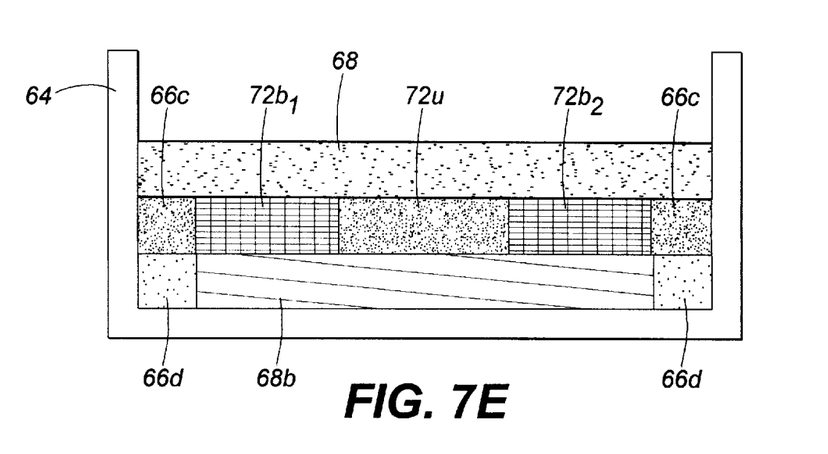

Returning to FIG. 7D, once regions $72b_1$ and $72b_2$ have been bound, a third layer of dielectric powder 68 is deposited as illustrated in FIG. 7E. Recall that the second layer of conductive powder 72 included a region of unbound powder 72u. Because region 72u will become a void in the final structure, the powder is not vacuumed away. As a result, care must be taken to ensure that the newly applied, dielectric powder 68 does not mix with unbound powder 72u, especially during compaction. In addition to region 72u, mixing of unbound powder can also be a problem near the edges or borders of form 64 where regions of unbound powder 66c and 66d remain after deposition of each layer. When compaction of the powder is done using a roller or sliding motion, unbound powder between separate layers may mix or may be drug into other regions of the structure thereby causing contamination. Clearly, contamination of conductive regions with dielectric powder will lower the conductivity, while conductive powder in dielectric regions will reduce the breakdown voltage of the region.

The preferred solution to the problem of powder mixing is to bind the entire layer of powder after it has been applied with a weak, water soluble binder. One example of a weak binder suitable for this purpose is a dilute mixture of polyvinyl alcohol with polyvinyl acetate. A strong binder is used to bind the regions of the powder that form the shape of the structure. Once the structure is fully formed, the soluble binder is removed prior to any heat treatment (i.e., sintering). If the structure is not heat treated, the strong binder (e.g., an epoxy binder) remains after the weak binder along with the temporarily bound powder has been washed from the structure.

While the use of a weak binder to temporarily bind powder is effective in preventing the mixing of different powders, it can inhibit the flow of powder from voids, which can compromise the shape and/or electrical characteristics of the final structure. For example, when a water soluble binder is washed away, the unbound powder that remains becomes wet and is difficult to remove from the structure. In those instances where it is critical to ensure free flow of unbound powder, a volatile, acrylic binder is preferred as the weak binder because it will depolymerize and evaporate when the structure is subjected to heat during sintering. Once the acrylic binder has evaporated, the unbound powder can be easily poured out of the structure leaving behind voids. The strong binder that is used with the acrylic binder can be an epoxy binder that is stable at the temperatures at which the acrylic binder depolymerizes and evaporates or a silica binder.

It is envisioned that other techniques could be used to reduce the potential for powder mixing and contamination. For example, rather than binding all unbound powder in the voids, a fraction, typically in the range from 10%–30%, could be bound to form an open lattice. The lattice would hold the unbound powder in place sufficiently to minimize mixing between powders. Using this technique, the same binder could be used to form the shape of the structure as is used to create the lattice that prevents powder mixing. The lattice should not interlock with the bound powder forming the shape of the structure. Once the three dimensional printing process is complete, the lattice can be pulled away from the finished structure.

Still another technique for minimizing powder mixing is to temporarily bind alternate layers of powder to reduce the mixing to an acceptable level. For example, if only the dielectric powder is temporarily bound, any conductive powder that mixes with the dielectric powder in a void region can be vacuumed away with the void remaining filled with temporarily bound dielectric powder.

Built in Electrical Parts

The preceding discussion has described a novel technique for building complex structures comprising regions having various properties (i.e., conductor regions, insulator regions, etc.) through three dimensional printing. While many features or parts can be built into a structure using the processes discussed hereinbefore (e.g., resistors, capacitors, wires, etc.), it is also desirable to incorporate discrete components or sub-assemblies into the structure during the printing process. Perhaps the simplest approach is to add surface mount components or assemblies to a structure once the printing process is complete. Building the components or assemblies into the structure during the printing process is preferred, however, as such an approach would save assembly costs and also reduce the size of the completed structure. Moreover, by building components into the structure, delicate components are protected from damage.

Figure 8A:
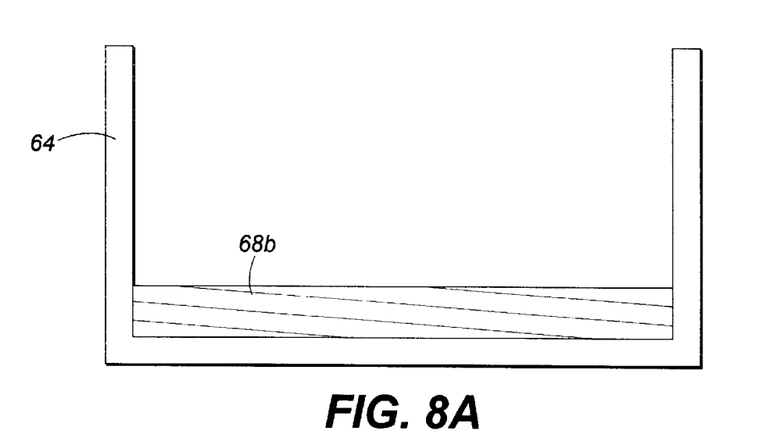
FIGS. 8A–8L are diagrammatic views that illustrate a modification to the multiple powder, three dimensional printing process of FIGS. 6A–6F in which external components or assemblies are incorporated into the structure.
Figure 8B:
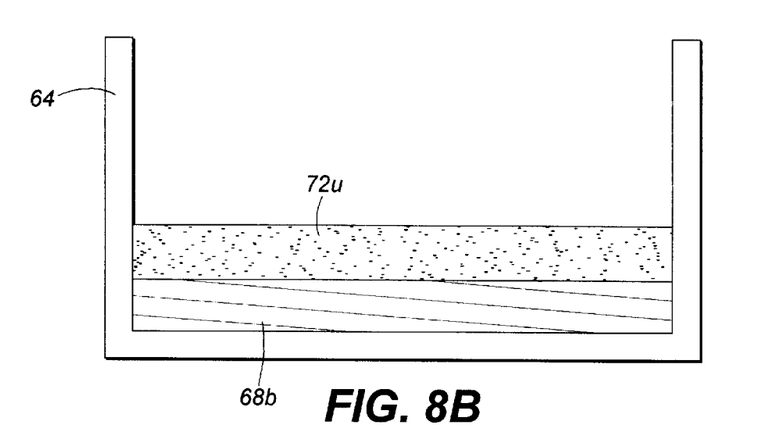
Figure 8C:
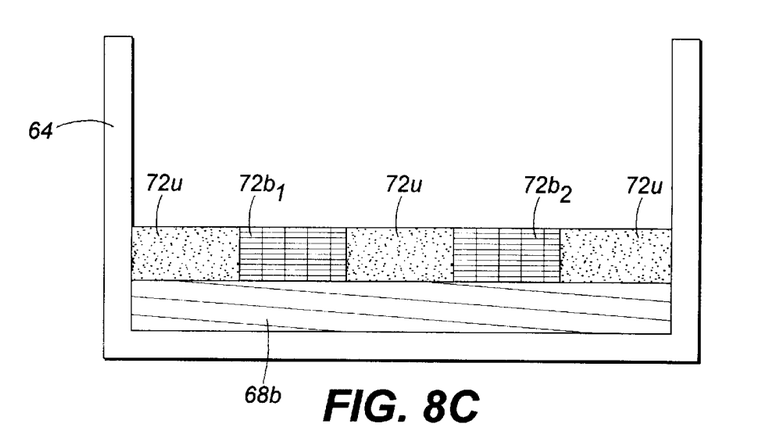
Figure 8D:
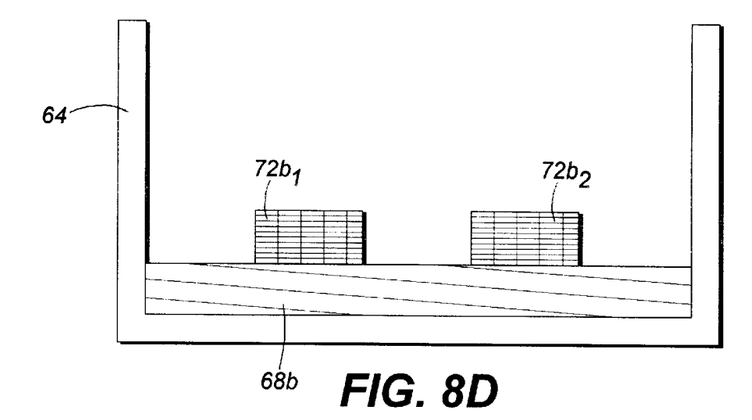
Figure 8E:
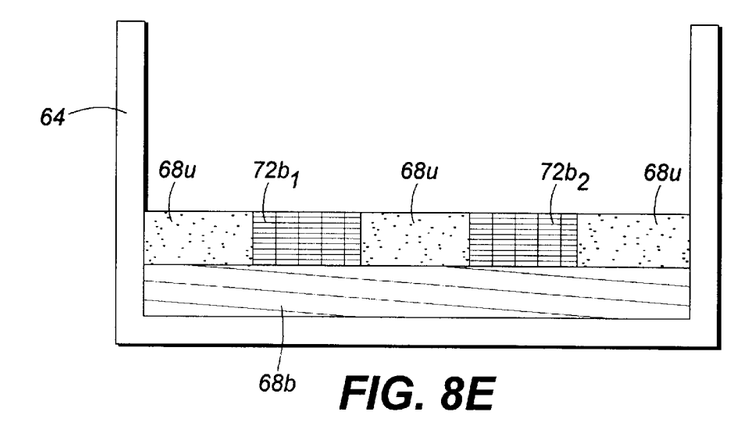
Figure 8F:
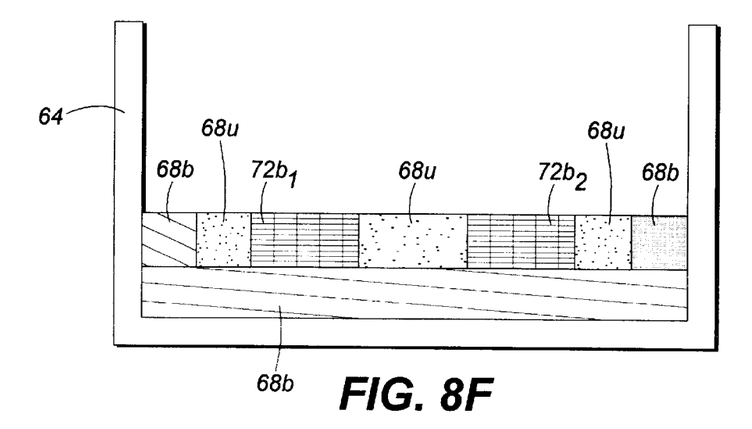
Figure 8G:
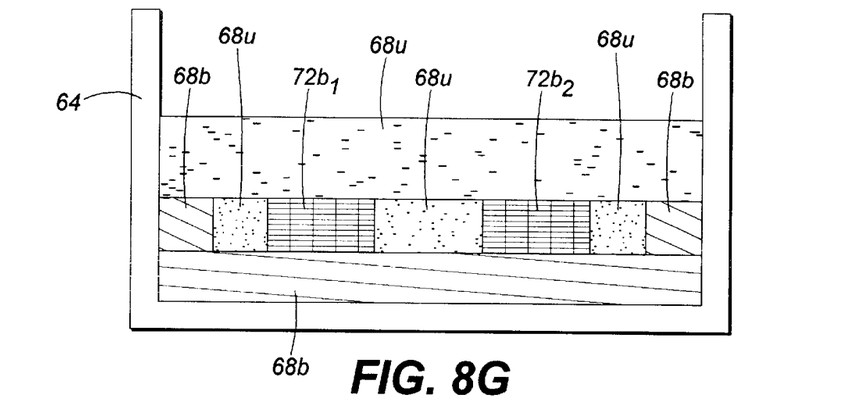
Figure 8H:
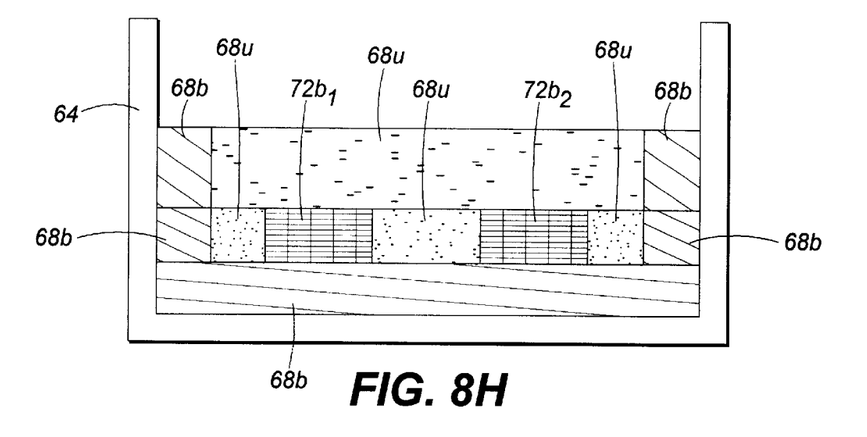

FIGS. 8A through 8L illustrate how the three dimensional printing process according to the present invention can be modified to integrate components or sub-assemblies during the printing process. In FIG. 8A, one or more layers of dielectric powder 68b have been deposited in form 64 and sprayed with a binder. Next, a layer of conductive powder 72u is applied as shown in FIG. 8B and two regions of conductive powder $72b_1$ and $72b_2$ are bound to form contacts for a sub-assembly or component to be inserted later in the process. In FIG. 8C, the unbound conductive powder 72u is vacuumed away leaving only the bound conductive contacts $72b_1$ and $72b_2$ disposed upon bound dielectric layer 68b. A layer of unbound dielectric powder 68u is applied as shown in FIG. 8E that fills in the open regions surrounding bound conductive contacts $72b_1$ and $72b_2$. In this example, dielectric powder 68u is selectively bound to define the basic shape of the structure with unbound powder left in specific areas that will become apertures or open space once the structure is complete. Thus, in FIG. 8F, binder is applied along the edge of the structure where dielectric powder 68u meets form 64 to form bound regions 68b in the second layer. This procedure of forming the basic framework of the structure is repeated as shown in FIGS. 8G and 8H where additional unbound dielectric powder 68u is applied and then a binder is applied along the edge of the structure where powder 68u meets form 64 to form bound regions 68b.

Figure 8I:
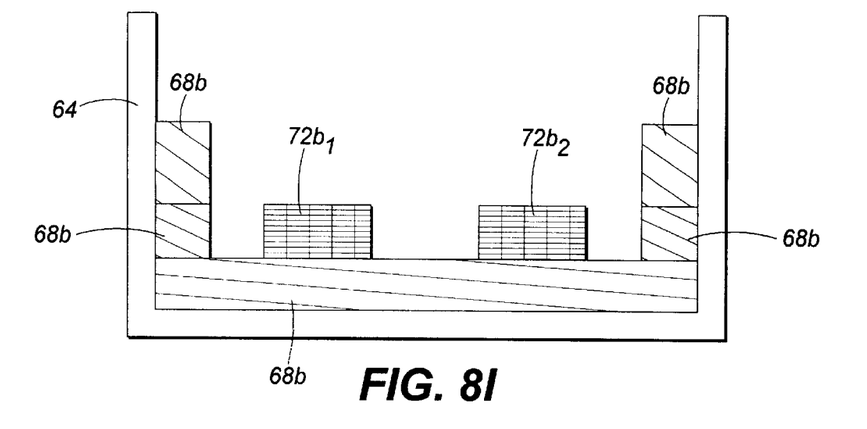
Figure 8J:
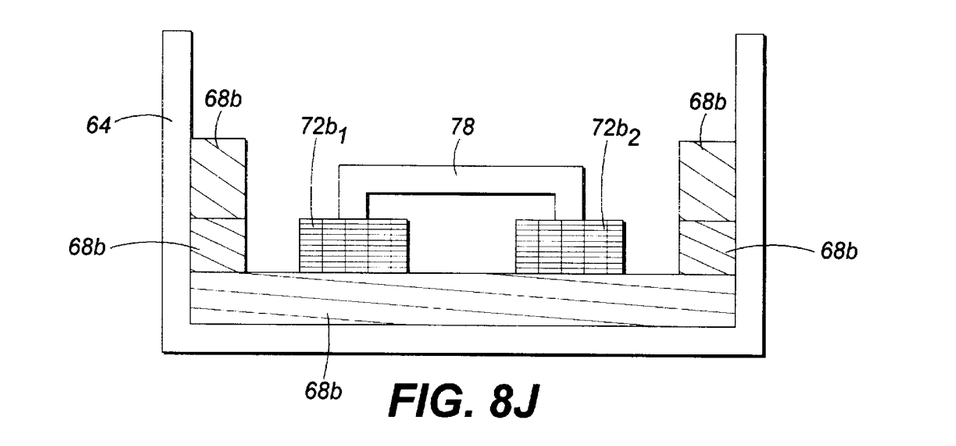
Figure 8K:
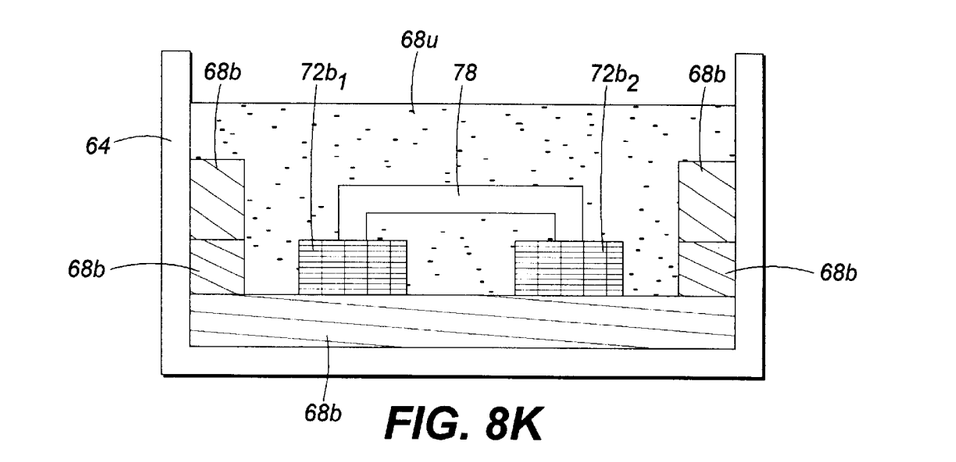
Figure 8L:
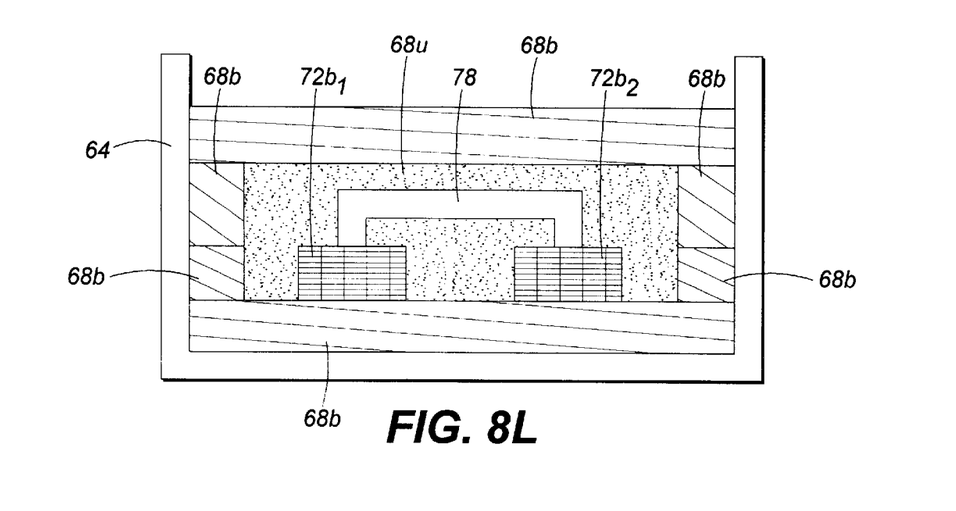

At this point in the process, all of the unbound powder is vacuumed away as shown in FIG. 8I, leaving conductive contacts $72b_1$ and $72b_2$ exposed upon a bound dielectric region 68b. In addition, the region 68b of bound dielectric powder extends upward along the edge of form 64 to define the overall shape of the structure. Now that the structure has reached a point in its development that it is ready to receive the external components, a robot is typically used to place the external component, module, or subassembly 78 into the structure. As illustrated in FIG. 8J, a component 78 has been positioned in engagement with conductive contacts $72b_1$ and $72b_2$. When a component is inserted into the structure, it is useful to use a conductive epoxy to effectively glue the component in place while simultaneously enhancing the electrical connection between the component and the conductive layer. The three dimensional printing process is then resumed in FIGS. 8K and 8L as form 64 is filled with unbound dielectric powder 68u until the powder covers the bound dielectric powder 68b disposed along the edge of form 64. Finally, as illustrated in FIG. 8L, binder is applied to the top layer of unbound dielectric powder 68u to form a bound layer of dielectric powder 68b that encloses component 78 in the structure. Note that it is customary to leave open channels or exit ports in the structure to allow the remaining unbound powder 68u to be shaken, vacuumed, or blown out of the completed structure.

Using the techniques discussed with reference to FIGS. 8A–8L a variety of complex structures can be constructed including such components as batteries, processors, sensors, actuators, coaxial cables, RF modules, hybrid couplers for microwave systems, and directional couplers for microwave systems. A key consideration when constructing complex structures incorporating external components or sub-assemblies is whether the components or sub-assemblies will withstand the sintering used to harden the bound structure. If the external components are heat sensitive, an epoxy binder should be used that does not require heat treating to maintain the integrity of the structure, or the components should be added after the sintering process completes either by a surface mount arrangement or into apertures or sockets designed into the structure.

The foregoing discussion described the insertion of components into evacuated regions or cavities within the structure. Alternatively, components that are thinner than the thickness of the powder layers can be attached to a bound region and then covered in a subsequent powder deposition step. As a result, a component can be incorporated into the structure such that it is entirely confined in a bound region of powder.

The principles of the present invention have been illustrated herein as they are applied to an improved three dimensional printing process for creating complex structures. From the foregoing, it can readily be seen that the improved three dimensional printing process can produce structures comprising a plurality of material types (e.g., conductive materials and dielectric materials). Moreover, the process can be adapted to incorporate external components or assemblies into the structure during the printing process. As a result, finished parts and/or prototypes can be produced in a fast and economical manner.

The three dimensional printing process of the present invention may be especially useful for constructing microwave systems or electromechanical devices. For example, a cooling system could be constructed by building motor windings and coolant channels, and then inserting bearings and an impeller.

It is envisioned that the three dimensional printing process of the present invention can be used, for example, to eliminate the necessity for wiring harnesses as internal wiring can be integrated into the structure during the printing process. The process can also be used to create an identification tag or code for a part. For example, internal wiring can be designed into the structure that creates a sequential pattern of shorts and open circuits that can be read as ones or zeros by an internal or external processor or logic system. This could allow one part or structure with an embedded microprocessor to identify another and adjust its behavior to the properties of the identified part. Similarly, the conductive regions could be designed to extend to the outer surface of the three dimensional structure, thus allowing an external processor or logic system to read a pattern of conductive regions and dielectric regions and thus identify the structure as a whole or a particular part used in the structure. This is especially useful in prototype systems where parts and components change often during development. Once the prototype is approved as a final product, the prototype's processor could read the identification numbers on all of the parts in the final iteration of the product to produce a parts list thus providing a self documentation feature.

The identification feature can also be used for purposes of theft or counterfeiting prevention. For example, identification codes could be embedded inside the structure in the form of empty cavities or cavities containing a material that would show up in an X-ray examination. For example, the material used to provide the needed contrast during an X-ray inspection preferably has a higher atomic number than the material(s) comprising the remainder of the structure. For example, in a structure comprising ceramic dielectric regions and copper conductive regions, such materials as nickel, iron, cromium, titanium, lead, and other heavy metals work well as X-ray absorbers. Zirconium ceramics also perform well in absorbing X-rays. In fact, thick regions of copper or aluminum/titanium conductors also provide the needed contrast if the remainder of the conductors in the structure are thin. An additional powder could also be used that has higher X-ray absorption characteristics than the remainder of the structure or even a binder that contains elements having a high atomic number. Also, instead of embedding a high X-ray absorption material in one or more cavities, thick regions of a high X-ray absorption or high atomic number material could be formed in the structure to provide the necessary contrast under X-ray examination. In general, smaller quantities are needed of materials that have a large atomic number compared to the remainder of the structure. Conversely, materials having an atomic number close to the atomic number of the majority of the remaining structure should be very thick to provide contrast under X-ray examination.

Similarly, the identification could be accomplished by a series of acoustic cavities that could be pinged with an acoustic signal and the response analyzed to determine cavity dimensions that correspond to a part identification.

As an additional identification feature, the device surface may be made textured in such a way that the appearance changes as a function of viewing and illumination direction. It is thus possible to construct lettering that cannot be photographically duplicated. By constructing a letter from a fine array of vertical spikes, it can be made to appear dark when viewed from above, but lighter than the background if viewed obliquely.

Another technique that is particularly useful to prevent unauthorized duplication of assemblies (i.e., counterfeiting) is to design an internal cavity or region of unbound powder that forms a fracture surface or region in the structure. That is, a particular cross section of the structure has a smaller bound area (i.e., a cavity or unbound powder is contained in this cross section) thus making the structure weaker and susceptible to fracture in this area. A name, logo, or other identifying mark can be printed into the fracture surface that will be revealed when the structure is broken. Such a fracture surface is typically completely enclosed, but covers nearly the entire cross-sectional area of the device. As such, it is virtually undetectable from the outside and therefore not likely to be copied, but can be easily revealed by fracturing the structure when proof of unauthorized duplication, or lack thereof, is required.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

We claim:

1. A process for making a three dimensional structure, comprising the steps of:

depositing a powder material in a defined area;

introducing a first binder material to at least one portion of said powder material thereby forming at least one region of a first type of solid material;

introducing a second binder material to at least one portion of said powder material thereby forming at least one region of a second type of solid material, wherein said second binder material is different from said first binder material;

leaving a third portion of said powder material unbounded by the binder materials, wherein said third portion has a generally smooth surface;

removing at least a portion of said unbound powder material from said generally smooth surface of said third portion to form at least one void; and prior to completing the three dimensional structure and after the step of removing at least said portion of said unbound powder, repeating the steps of depositing said powder material in said defined area and introducing said first binder material.

2. The process of claim 1, further comprising the step of:
sintering said at least one region of said first type of solid material to harden the three dimensional structure.

3. The process of claim 1, further comprising the step of:
inserting a component into said at least one void such that said component engages said at least one region of said first type of solid material.

4. The process of claim 1, wherein said first binder material chemically reacts with said powder material thereby altering the electrical conductivity of said at least one region of said first type of solid material.

5. The process of claim 1, wherein said first binder material is a conductive binder material and said second binder material is a dielectric binder material, such that said first type of solid material is electrically conductive so as to form at least one electrically conductive region and said second type of solid material is electrically insulative so as to form at least one electrically insulative region.

6. The process of claim 5, wherein said powder material is a mixture of metallic and ceramic powders.

7. The process of claim 5, wherein a portion of said at least one electrically conductive region and a portion of said at least one electrically insulative region are sequentially arranged to form an identification code for the three dimensional structure.

8. The process of claim 7, wherein said portion of said at least one electrically conductive region comprising said identification code is accessible at an outer surface of the three dimensional structure.

9. The process of claim 8, further comprising the step of:
providing a logic system for electrical communication with said portion of said at least one electrically conductive region at said outer surface.

10. The process of claim 7, further comprising the step of:
inserting a logic system into said at least one void, said logic system being in electrical communication with said portion of said at least one electrically conductive region comprising said identification code.

11. The process of claim 5, further comprising the step of:
electroplating said at least one electrically conductive region.

12. The process of claim 1, wherein a plurality of separate voids are created, said voids being sequentially arranged to form an identification code for the three dimensional structure.

13. The process of claim 12, further comprising the step of:
injecting an acoustic signal into each of said voids and measuring the response thereto, said identification code being comprised of said responses to said acoustic signal.

14. The process of claim 12, further comprising the step of:
filling a portion of said voids with a second material having a higher atomic number on average than the remainder of the three dimensional structure, said identification code being comprised of said sequence of filled and unfilled voids.

15. The process of claim 1, further comprising the step of:
producing a texture in a portion of said at least one region of said first type of solid material so that said textured portion has an appearance that changes as a function of a viewing and an illumination direction.

16. A process for making a three dimensional structure, comprising the steps of:

depositing a first powder material in a defined area;

introducing a binder material to at least one portion of said first powder material to form at least one region of a first type of solid material;

depositing a second powder material within said defined area;

introducing a second binder material to at least one portion of said second powder material to form at least one region of a second type of solid material;

leaving at least one portion of said first and second powder materials unbound by the binder materials, wherein said unbound powder has a generally smooth surface;

removing at least a portion of said unbound powder material having said generally smooth surface to form at least one void; and prior to completing the three dimensional structure and after step the of removing at least said portion of said unbound powder, repeating the steps of depositing said first powder material in said defined area and introducing said binder material.

17. The process of claim 16, wherein said first powder material is a conductive powder material and said second, powder material is a dielectric powder material.

18. The process of claim 17, wherein a portion of said at least one region of a first type of solid material and said portion of said at least one region of said second type of solid material are sequentially arranged to form an identification code for the three dimensional structure.

19. The process of claim 18, wherein said portion of said at least one region of said first type of solid material is accessible at an outer surface of the three dimensional structure.

20. The process of claim 19, further comprising the step of:
providing a logic system for electrical communication with said portion of said at least one region of said first type of solid material at said outer surface.

21. The process of claim 18, further comprising the step of:
inserting a logic system into said at least one void, said logic system being in electrical communication with said portion of said at least one region of said first type of solid material comprising said identification code.

22. The process of claim 17, further comprising the step of:
electroplating said at least one region of said first type of solid material.

23. The process of claim 17, wherein said step of removing at least a portion of said unbounded powder material comprises the steps of:
electrically charging some of said powder material; and
attracting said electrically charged powder material with an instrument having an opposite electrical charge with respect to said charged powder material.

24. The process of claim 16, wherein a plurality of voids are created, said voids being sequentially arranged to form an identification code for the three dimensional structure.

25. The process of claim 24, further comprising the step of:

injecting an acoustic signal into each of said voids and measuring the response thereto, said identification code being comprised of said responses to said acoustic signal.

26. The process of claim 24, further comprising the step of:

filling a portion of said voids with a third material having a higher atomic number on average than the remainder of the three dimensional structure, said identification code being comprised of said sequence of filled and unfilled voids.

27. The process of claim 16, further comprising the step of:

producing a texture in a portion of said at least one region of said first type of solid material and said at least one region of said second type of solid material so that textured portion has an appearance that changes as a function of a viewing and an illumiantion direction.

28. The process of claim 16, further comprising the step of:

forming a fracture region in the three dimensional structure such that said fracture region has a fracture surface having an identifying mark formed thereon.

29. The process of claim 16, wherein said unbounded powder material is removed via vacuuming.

30. The process of claim 16, further comprising the step of:

curing said first and second powder materials with ultra violet light.

31. The process of claim 16, further comprising the step of:

corona treating said first and second type of solid materials.

32. The process of claim 16, further comprising the step of:

introducing a water soluble binder into a portion of at least one of said first and second powder materials.

33. The process of claim 16, further comprising the step of:

introducing an acrylic binder into a portion of at least one of said first and second powder material.

34. The process of claim 16, further comprising the steps of:

depositing one of said first and second powder materials over one of said at least one region of said first type of solid material and said at least one region of said second type of solid material after introducing said binder material; and vacuuming said one said first and second powder materials.

* * * * *